United States Patent
Horiuchi

(10) Patent No.: US 11,263,878 B2
(45) Date of Patent: Mar. 1, 2022

(54) PHASE COMPUTING DEVICE, PHASE COMPUTING METHOD, HAPTIC PRESENTATION SYSTEM, AND PROGRAM

(71) Applicant: Sony Corporation, Tokyo (JP)

(72) Inventor: Yuya Horiuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/637,566

(22) PCT Filed: Jun. 13, 2018

(86) PCT No.: PCT/JP2018/022598
§ 371 (c)(1),
(2) Date: Feb. 7, 2020

(87) PCT Pub. No.: WO2019/031057
PCT Pub. Date: Feb. 14, 2019

(65) Prior Publication Data
US 2020/0258357 A1    Aug. 13, 2020

(30) Foreign Application Priority Data
Aug. 7, 2017    (JP) .............................. JP2017-152151

(51) Int. Cl.
*G08B 6/00*    (2006.01)
*G06F 3/01*    (2006.01)

(52) U.S. Cl.
CPC .............. *G08B 6/00* (2013.01); *G06F 3/016* (2013.01)

(58) Field of Classification Search
CPC .................................. G08B 6/00; G06F 3/016

USPC ....................................................... 340/407.2
See application file for complete search history.

(56) References Cited

U.S. PATENT DOCUMENTS

| 10,101,811 | B2 * | 10/2018 | Carter ..................... G06F 3/016 |
| 10,133,353 | B2 * | 11/2018 | Eid ....................... G06F 3/04815 |
| 10,531,212 | B2 * | 1/2020 | Long ....................... G06F 3/016 |
| 10,818,162 | B2 * | 10/2020 | Carter ..................... G10K 11/32 |
| 2011/0148607 | A1 | 6/2011 | Zeleny |

(Continued)

FOREIGN PATENT DOCUMENTS

| CN | 101410061 A | 4/2009 |
| CN | 103620928 A | 3/2014 |

(Continued)

OTHER PUBLICATIONS

International Search Report and Written Opinion issued in connection with PCT/JP2018/022598, dated Aug. 14, 2018. (9 pages).

(Continued)

*Primary Examiner* — Zhen Y Wu
(74) *Attorney, Agent, or Firm* — K&L Gates LLP

(57) ABSTRACT

A phase computing device according to an embodiment of the present technology includes a coordinate determination unit and a computing unit.

The coordinate determination unit determines space coordinates at which an interference pattern of wave motion emitted from a vibrator phased array is to be presented, the wave motion including ultrasonic waves, electromagnetic waves, or other waves. The computing unit calculates an initial phase of each vibrator, a sum of energy densities of the wave motion at respective points of the space coordinates being maximum in the initial phase.

18 Claims, 8 Drawing Sheets

(56) References Cited

U.S. PATENT DOCUMENTS

| | | | |
|---|---|---|---|
| 2013/0172906 A1 | 7/2013 | Olson | |
| 2015/0192995 A1* | 7/2015 | Subramanian | G01C 21/3652 |
| | | | 340/407.1 |
| 2016/0164174 A1* | 6/2016 | Kullstam | H01Q 3/34 |
| | | | 342/368 |
| 2016/0246374 A1 | 8/2016 | Carter et al. | |
| 2016/0249150 A1* | 8/2016 | Carter | G08B 6/00 |
| 2017/0123499 A1* | 5/2017 | Eid | G10K 15/00 |
| 2017/0193768 A1* | 7/2017 | Long | G01S 15/06 |
| 2018/0151035 A1* | 5/2018 | Maalouf | G06F 3/017 |
| 2018/0358696 A1* | 12/2018 | Shapoury | H01Q 3/24 |
| 2020/0258357 A1* | 8/2020 | Horiuchi | G08B 6/00 |

FOREIGN PATENT DOCUMENTS

| | | |
|---|---|---|
| CN | 104866098 A | 8/2015 |
| CN | 105210390 A | 12/2015 |
| CN | 105426024 A | 3/2016 |
| JP | 2003-029898 A | 1/2003 |
| JP | 2012-048378 A | 3/2012 |
| JP | 2013-168124 A | 8/2013 |

OTHER PUBLICATIONS

Hasegawa et al., Generation of Remote Tactile Sensation with Controlled Spatial Distribution of Airborne Ultrasound Amplitude, No. 13-2 Proceedings of the 2013 JSME Conference on Robotics and Mechatronics, Tsukaba, Japan, May 22-25, 2013. (16 pages).

Hoshi, et al., Tactile Display Using Airborne Ultrasound Phased Array, Proceeding abstracts of the 13th academic conference of the Virtual Reality Society of Japan, p. 568-569, Sep. 24, 2008. (11 pages).

Hoshi, et al., Noncontact Tactile Display Based on Radiation Pressure of Airborne Ultrasound, IEEE Transactions on Haptics, vol. 3, No. 3, Sep. 30, 2010, pp. 155-165. (11 pages).

Inoue, et al., Active Touch Perception Produced by Airborne Ultrasonic Haptic Hologram, 2015 IEEE World Haptics Conference, Aug. 6, 2015, pp. 362-367. (6 pages).

* cited by examiner

| | Pattern 1 | Pattern 2 | Pattern 3 | Pattern 4 | Pattern 5 |
|---|---|---|---|---|---|
| Input shape |  |  |  |  |  |
| Acoustic radiation pressure |  |  |  |  |  |
| Vibrator arrangement |  |  |  |  |  |
| Phase distribution |  |  |  |  |  |

| | Pattern 1 | Pattern 2 | Pattern 3 | Pattern 4 | Pattern 5 |
|---|---|---|---|---|---|
| Input shape | . | : | L | O | ⌒⌒ |
| Acoustic radiation pressure | | | | | |
| Vibrator arrangement | | | | | |
| Phase distribution | | | | | |

FIG.6

PHASE COMPUTING DEVICE, PHASE COMPUTING METHOD, HAPTIC PRESENTATION SYSTEM, AND PROGRAM

TECHNICAL FIELD

The present technology relates to, for example, a phase computing device, a phase computing method, a haptic presentation system, and a program, which are capable of forming an ultrasonic interference pattern with an optional shape.

BACKGROUND ART

In recent years, devices that present the feeling of touching a virtual object on a space without being worn has started to be developed along with the diffusion of VR (virtual reality). One of the devices is a spatial haptic presentation device using ultrasonic waves. The ultrasonic spatial haptic presentation device includes several tens to several hundreds of ultrasonic vibrators disposed in an array, forms mutually strengthening points and lines on a space by interference of ultrasonic waves emitted by the individual vibrators, and presents haptic feedback to the air by an acoustic radiation pressure thereof.

For example, Patent Literature 1 discloses a tactile device that controls the phase of ultrasonic waves, which are emitted by ultrasonic wave generation elements arranged one- or two-dimensionally, for each of the elements, to achieve a desired sound pressure distribution in an arrangement direction of the elements.

CITATION LIST

Patent Literature

Patent Literature 1: Japanese Patent Application Laid-open No. 2003-29898

DISCLOSURE OF INVENTION

Technical Problem

In order to present spatial haptic feedback with the ultrasonic waves emitted by the ultrasonic vibrator array, it is necessary to control the phases of the individual vibrators and cause the ultrasonic waves to interfere with each other so as to be mutually strengthened at a position at which the spatial haptic feedback is intended to be presented. In a case where only one point of haptic feedback is to be presented on a space, a distance from the point to each vibrator is divided by the wavelength of the ultrasonic waves, and the phase of a remainder portion of the wavelength is adjusted for each of the individual vibrators, thus enabling the spatial haptic feedback to be presented relatively easily.

In a case where the spatial haptic feedback is to be presented in an interference pattern with an optional shape including a plurality of points, straight lines, curved lines, and the like, however, the interference of the opposite phase may occur, in which ultrasonic waves interfering at a certain point cancel out the acoustic radiation pressure of a different interference point. This makes it difficult to form an ultrasonic interference pattern with a desired optional shape.

In view of the circumstances as described above, it is an object of the present technology to provide a phase computing device, a phase computing method, a haptic presentation system, and a program, which are capable of forming an ultrasonic interference pattern with an optional shape.

Solution to Problem

According to an embodiment of the present technology, there is provided a phase computing device including a coordinate determination unit and a computing unit.

The coordinate determination unit determines space coordinates at which an interference pattern of wave motion emitted from a vibrator phased array is to be presented, the wave motion including ultrasonic waves, electromagnetic waves, or other waves.

The computing unit calculates an initial phase of each vibrator, a sum of energy densities of the wave motion at respective points of the space coordinates being maximum in the initial phase.

In the phase computing device, the computing unit calculates the initial phase of each vibrator of the ultrasonic vibrator array, in which the sum of the energy densities of the wave motion at the respective points on the space is maximum, an interference pattern being to be presented at the respective points. Accordingly, the interference pattern of the wave motion with an optional shape can be formed.

The computing unit may be configured to generate an evaluation function indicating a correlation between the sum of the energy densities of the wave motion at the respective points of the space coordinates and the initial phase of each vibrator, and to calculate an optimum solution of the initial phase of each vibrator, the evaluation function being made maximum or maximal by the optimum solution.

In this case, the computing unit may be configured to perform iterative computation of a recurrence formula of a gradient descent, to cause a computed value to converge to the optimum solution, the recurrence formula being obtained by differentiating the evaluation function.

Accordingly, it is possible to efficiently calculate a maximum or maximal value of the sum of the energy densities of the wave motion at the respective points of the space coordinates.

The computing unit may be configured to calculate a step coefficient, the step coefficient being obtained by dividing a predetermined constant by the number of points constituting the space coordinates, and to perform iterative computation of the recurrence formula with the step coefficient being as an update width for each step.

Accordingly, it is possible to enhance the efficiency of convergence to an optimum solution.

The computing unit may be configured to execute, in a case where a computation result of the recurrence formula is smaller than a last computation result, processing of decreasing the step coefficient.

Accordingly, it is possible to enhance the efficiency of convergence to an optimum solution.

The computing unit may be configured to output, in a case where a difference between a computation result of the recurrence formula and a last computation result is smaller than a predetermined threshold, a current computation result as the optimum solution.

Accordingly, it is possible to achieve a reduction in computation time.

The computing unit may be configured to perform iterative computation of a recurrence formula, to cause a computed value to converge to the optimum solution, the recurrence formula being obtained by dividing a derivative term of the evaluation function at each point of the space coordinates by the ultrasonic energy density of the wave motion at the point.

Accordingly, it is possible to smooth the distribution of the energy densities of the wave motion, in which the sum is maximal, and to optimize the energy density of the wave motion for each point on the interference pattern.

The computing unit may be configured to divide, in a case where the ultrasonic energy density at each point is a value of 0 or close to 0, the derivative term with the energy density of the wave motion being set to be larger than the value in order to avoid diffusion due to the division.

Accordingly, it is possible to enhance the efficiency of convergence to an optimum solution.

The computing unit may be configured to initialize, in a calculation of the optimum solution, the initial phase of each vibrator with an identical value.

Accordingly, it is possible to enhance the probability of convergence to an optimum solution.

The coordinate determination unit may be configured to determine, as the space coordinates, two-dimensional coordinates indicating the interference pattern, and a distance coordinate from the vibrator phased array to a presentation position of the interference pattern.

Accordingly, it is possible to form an interference pattern of wave motion with a desired shape at an optional position.

The coordinate determination unit may be configured to determine the two-dimensional coordinates on the basis of electronic image data indicating the interference pattern, and to determine three-dimensional coordinates of a haptic pattern together with distance information, the distance information being input in a numerical value.

According to an embodiment of the present technology, there is provided a phase computing method including determining space coordinates at which an interference pattern of wave motion emitted from a vibrator phased array is to be presented, the wave motion including ultrasonic waves, electromagnetic waves, or other waves.

An initial phase of each vibrator is calculated, a sum of energy densities of the wave motion at respective points of the space coordinates being maximum in the initial phase.

According to an embodiment of the present technology, there is provided a haptic presentation system including a vibrator phased array, a coordinate determination unit, and a computing unit.

The coordinate determination unit determines space coordinates at which an interference pattern of wave motion emitted from the vibrator phased array is to be presented, the wave motion including ultrasonic waves, electromagnetic waves, or other waves.

The computing unit calculates an initial phase of each vibrator, a sum of energy densities of the wave motion at respective points of the space coordinates being maximum in the initial phase.

The haptic presentation system may further include: an input unit to which information associated with the interference pattern is input; and a detector that detects a position at which the interference pattern is to be presented.

The coordinate determination unit determines the space coordinates on the basis of an output of the input unit and an output of the detector.

According to an embodiment of the present technology, there is provided a program that causes a computer to execute the steps of: determining space coordinates at which an interference pattern of wave motion emitted from a vibrator phased array is to be presented, the wave motion including ultrasonic waves, electromagnetic waves, or other waves; and calculating an initial phase of each vibrator, a sum of energy densities of the wave motion at respective points of the space coordinates being maximum in the initial phase.

According to another embodiment of the present technology, there is provided a phase computing device including a coordinate determination unit and a computing unit.

The coordinate determination unit determines space coordinates at which an interference pattern of electromagnetic waves emitted from a vibrator array is to be presented.

The computing unit calculates an initial phase of each vibrator, a sum of electromagnetic energy densities at respective points of the space coordinates being maximum in the initial phase.

Advantageous Effects of Invention

As described above, according to the present technology, it is possible to form an ultrasonic interference pattern with an optional shape.

It should be noted that the effects described herein are not necessarily limited, and any one of the effects described in the present disclosure may be produced.

BRIEF DESCRIPTION OF DRAWINGS

FIG. 6 shows simulation results showing another action of the haptic presentation system.

MODE(S) FOR CARRYING OUT THE INVENTION

Hereinafter, an embodiment according to the present technology will be described with reference to the drawings.

Figure 1:
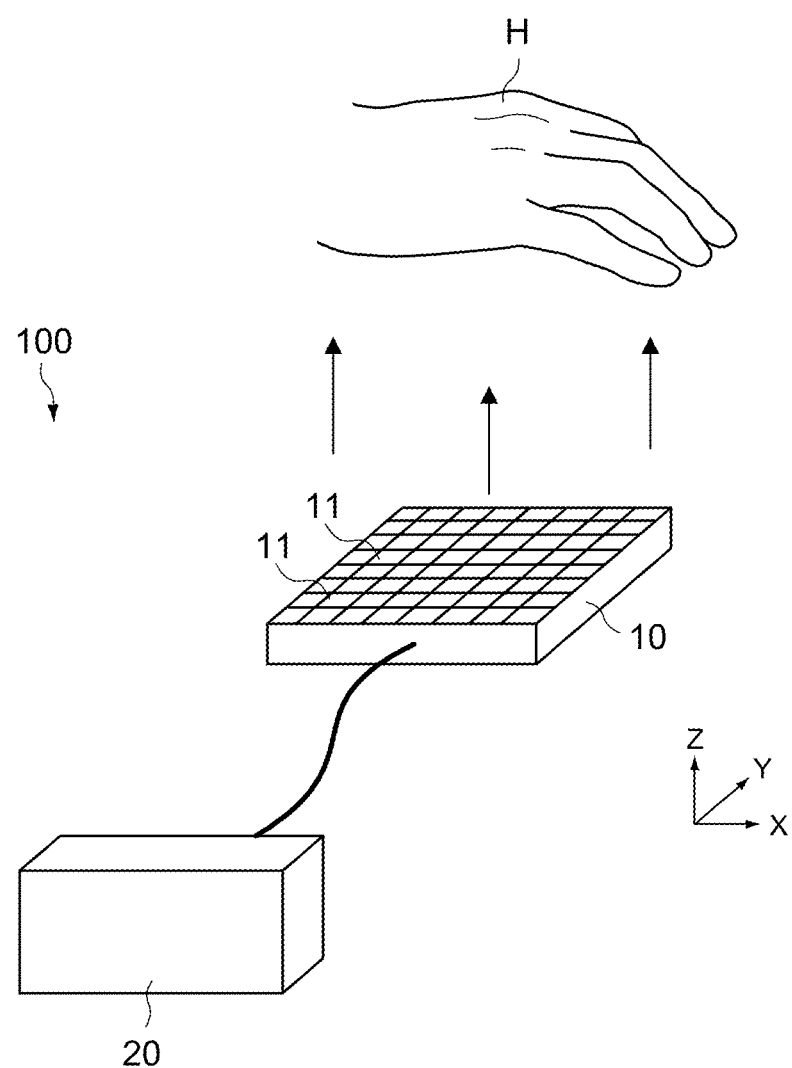
FIG. 1 is a schematic configuration diagram showing a haptic presentation system according to an embodiment of the present technology.

FIG. 1 is a schematic configuration diagram showing a haptic presentation system according to an embodiment of the present technology. In the figure, X-, Y-, and Z-axes respectively represent three axes directions orthogonal to one another, and the Z-axis corresponds to an ultrasonic wave emission direction.

[Haptic Presentation System]

A haptic presentation system 100 of this embodiment includes an ultrasonic vibrator array 10 and a controller 20.

The ultrasonic vibrator array 10 is configured by a phased array including a plurality of (N pieces) ultrasonic vibrators, the phases of which are capable of being individually controlled. The individual vibrators 11 constituting the ultrasonic vibrator array 10 are typically configured by vibration elements each having an identical structure and are two-dimensionally arranged such that respective ultrasonic wave emission ports are positioned on the identical plane (XY-plane). An arrangement form is not particularly limited. Typically, the individual vibrators 11 are arranged in a grid-like or hexagonal close-packed manner. The number of vibrators 11 is also not particularly limited and can be appropriately set depending on specifications or purposes. For example, the number of vibrators 11 is several tens to several hundreds. The frequency of ultrasonic waves is also not particularly limited and is typically 20 kHz or more.

The ultrasonic vibrator array 10 forms mutually strengthening points and lines on a space by interference of ultrasonic waves emitted by the individual vibrators 11 and presents, by using an acoustic radiation pressure (energy density of ultrasonic waves) thereof, haptic feedback to the user's hand and fingers (hereinafter, collectively referred to as hand/finger H), which are positioned on the space.

The controller 20 is configured to be capable of computing an initial phase of each vibrator 11, which forms an ultrasonic interference pattern with a desired and optional shape, and capable of driving each vibrator 11 with the calculated initial phase.

Figure 2:
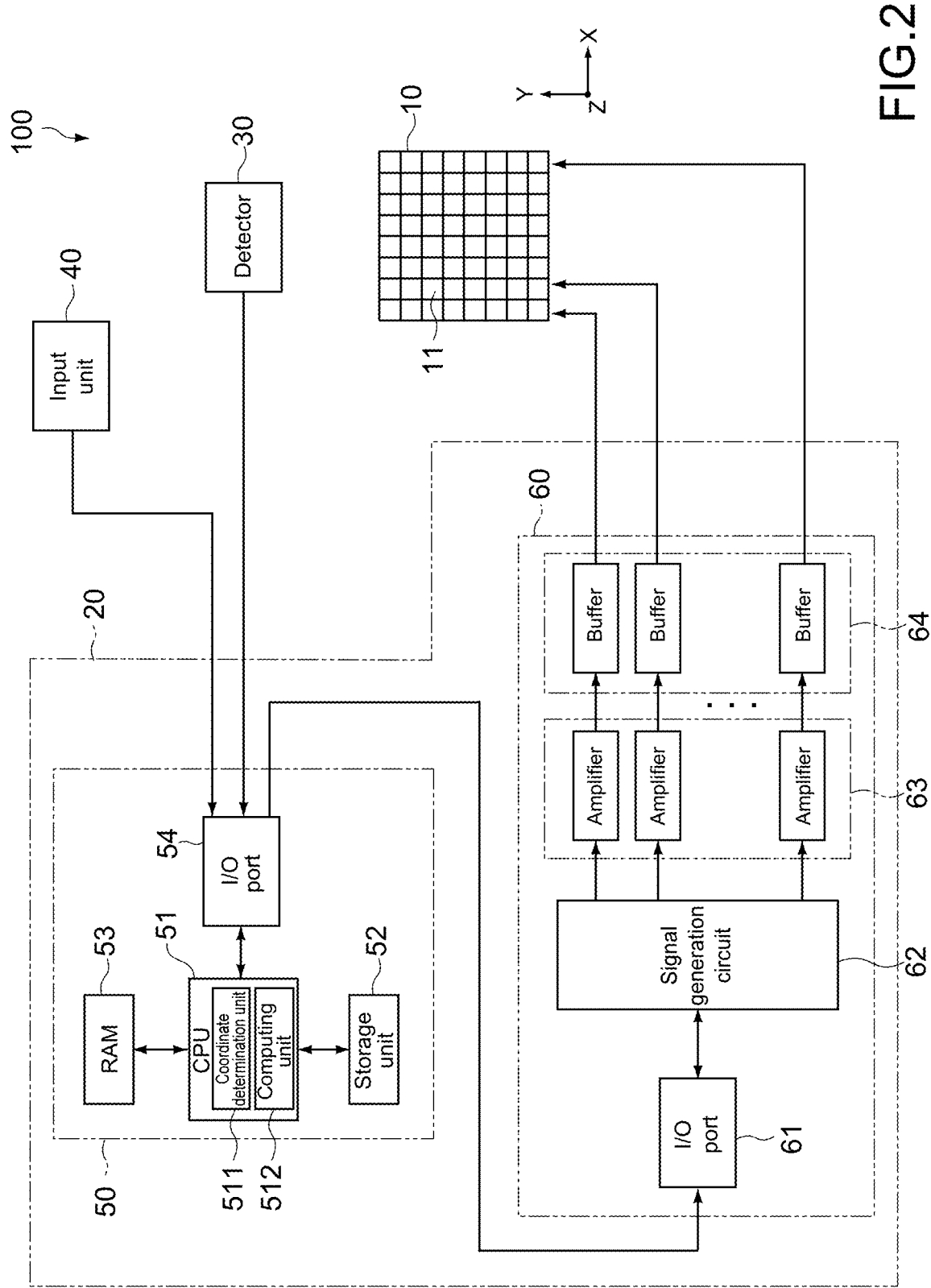
FIG. 2 is a block diagram showing a system configuration of each unit of a haptic presentation system 100.

FIG. 2 is a block diagram showing a system configuration of each unit of the haptic presentation system 100. The haptic presentation system 100 further includes a detector 30 and an input unit 40.

The detector 30 detects a position at which an ultrasonic interference pattern is to be presented (a position of the hand/finger H of the user, positioned immediately above the ultrasonic vibrator array 10). Typically, the detector 30 detects two-dimensional coordinates (X and Y coordinates) obtained by projecting the shape of the hand/finger H on the ultrasonic vibrator array, and distance information (Z coordinate) corresponding to the height from the ultrasonic wave emission surface of the ultrasonic vibrator array 10 to the hand/finger H. The detector 30 may be configured integrally with the ultrasonic vibrator array 10 or configured as a part of the ultrasonic vibrator array 10.

The configuration of the detector 30 is not particularly limited, and ranging sensors such as a TOF (Time of Flight)-type or phase-difference-type laser displacement gauge, and imagers such as an infrared ray camera can be employed. The detector 30 is configured to output the detected measured value to the controller 20. The detector 30 may output acquired data such as image information directly to the controller 20. In this case, coordinate information of the hand/finger H is extracted in the controller 20 on the basis of the acquired data.

The height position of the hand/finger H to be detected by the detector 30 may be one point or a plurality of points. In a case where one point is detected, for example, the center portion of the palm of the hand/finger H is detected as a representative value. In a case where a plurality of points is detected, for example, the height position of the palm of the hand/finger H and/or each finger is detected.

The input unit 40 includes an input device capable of inputting information (such as shape) associated with the ultrasonic interference pattern to be presented to the hand/finger H. The input unit 40 may be configured integrally with the controller 20 or may be configured as a part of the controller 20.

The pattern shape typically includes a two-dimensional image of the XY coordinate system or a three-dimensional image of the XYZ coordinate system. For the input unit 40, for example, a scanning device that electronically takes in prepared images, a drawing device including a drawing tool, and an input device including a GUI (Graphic User Interface) to be operated for input by a user can be used. The pattern shape may be image data having a shape optionally selected from a plurality of shapes prepared in advance. The image data is transmitted, as appropriate electronic image data such as bitmap data or CAD data, to the controller 20. The number of pixels or the number of bits of the image data is not particularly limited and can be appropriately set according to the number of vibrators constituting the ultrasonic vibrator array 10, or the like.

[Controller]

Subsequently, details of the controller 20 will be described. The controller 20 includes a phase computing device 50 and a drive unit 60.

The phase computing device 50 is configured by a computer and includes a CPU 51, a storage unit 52, a RAM (Random Access Memory) 53, an I/O (Input/Output) port 54, and the like.

The CPU 51 includes a coordinate determination unit 511 and a computing unit 512.

The coordinate determination unit 511 determines space coordinates at which an interference pattern of ultrasonic waves emitted from the ultrasonic vibrator array 10 is to be presented. The coordinate determination unit 511 determines the space coordinates on the basis of the outputs of the detector 30 and the input unit 40, which are input via the I/O port 54.

The coordinate determination unit 511 determines, as the space coordinates, three-dimensional coordinates (X, Y, Z) indicating an interference pattern, by an input operation of the user or computation. Typically, the three-dimensional coordinates described above are determined on the basis of the output of the input unit 40. In this embodiment, the coordinates described above are determined on the basis of two-dimensional (X, Y) or three-dimensional (X, Y, Z) electronic data (such as bitmap or CAD data) input from the input unit 40. In a case where two-dimensional (X, Y) electronic data is input, a distance coordinate (Z) from the ultrasonic vibrator array 10 to an interference pattern presentation position is input in a numerical value via the input unit 40.

The computing unit 512 computes the initial phases of the individual vibrators 11 of the ultrasonic vibrator array 10 by using a predetermined algorithm to be described later. The computing unit 512 outputs information (initial phase data) regarding the computed initial phases of the respective vibrators 11 to the drive unit 60 via the I/O port 54.

The storage unit 52 includes, for example, an information storage device such as an HDD (Hard Disk Drive) or SSD (Solid State Drive) and stores various programs to be executed in the CPU 51, parameters, and the like. The programs and the like stored in the storage unit 52 are read when the CPU 51 executes various types of processing, and are decompressed in the RAM 53.

The programs are installed in, for example, the phase computing device 50 via various recording media. Alternatively, the programs may be installed via the Internet or the like. As will be described later, the programs cause the controller 20 (phase computing device 50) to execute the step of determining space coordinates at which an interference pattern of ultrasonic waves emitted from the ultrasonic vibrator array 10 is to be presented, and the step of calculating an initial phase of each vibrator 11, the sum of ultrasonic energy densities at respective points of the space coordinates described above being maximum in the initial phase.

The drive unit 60 includes an I/O port 61, a signal generation circuit 62, amplifiers 63, and buffers 64.

The drive unit 60 receives initial phase data, which is generated in the phase computing device 50, via the I/O port 61. The signal generation circuit 62 is a circuit that generates a pulse width modulation signal for driving each vibrator 11 of the ultrasonic vibrator array 10 on the basis of the initial phase data and includes, for example, FPGA (Field Programmable Gate Array). The pulse width modulation signal is individually generated for each vibrator 11. Each signal is amplified by the amplifier 63, a voltage thereof is corrected by the buffer 64, and the resultant signal is output, as a drive signal, to the ultrasonic vibrator array 10.

The ultrasonic vibrator array 10 drives each vibrator 11 on the basis of the drive signal described above. Accordingly, an ultrasonic interference pattern having a maximum ultrasonic energy density at the position and in the shape specified by the user is formed, and a spatial haptic pattern corresponding to an acoustic radiation pressure thereof is presented to the user.

Here, in a case where only one point of haptic feedback is to be presented on a space, a distance from the point to each vibrator is divided by the wavelength of the ultrasonic waves, and the phase of the remainder portion of the wavelength is adjusted for each of the individual vibrators, thus enabling the spatial haptic feedback to be presented. Specifically, a distance from an optional point, at which spatial haptic feedback is intended to be presented, to an i-th vibrator is represented by ri, the wavelength of the ultrasonic waves is represented by λ, a modulo function is represented by MOD, and the following initial phase θi is added to the i-th vibrator, thus enabling the spatial haptic feedback to be relatively easily achieved.

$$\theta i = (2\pi/\lambda) \text{MOD}(ri/\lambda) [\text{rad}]$$

In contrast to the above, in a case where spatial haptic feedback with the shape including a plurality of points, straight lines, and curved lines is intended to be presented, various problems occur as follows.

First, there is a method of moving one interference point to present spatial haptic feedback with an optional shape. However, this method provides the feeling of "being traced" or "fluttering" regarding the haptic feedback in many cases and is not suitable for the expression of a stationary object or the like.

Meanwhile, a method of causing ultrasonic waves to interfere with not one point but the shape including a plurality of points and lines from the start is conceivable. However, in a calculation method using a distance ri similar to the distance ri of the case of one point, the interference of the opposite phase is also likely to occur, in which ultrasonic waves interfering at a certain point cancel out the acoustic radiation pressure of another interference point. Thus, the idea of total optimization in the phase control, in which the distribution of the acoustic radiation pressure is taken into account, becomes necessary.

Furthermore, if the phase of the individual vibrator is given, even an existing ultrasonic simulator can calculate an interference pattern. In this method, however, it is assumed that an input phase for forming a desired interference pattern is known. Therefore, in a case where an unknown input phase for forming a particular interference pattern is intended to be obtained, it is necessary to confirm an interference pattern after inputting options of the phase and executing computation. If the desired interference pattern is not obtained, it is necessary to input options of a different phase again and reexecute computation. If such iterative computation is automated, the amount of computation increases, and it will take a considerable amount of time to perform computation until an optimum solution is obtained.

In order to solve the problems as described above, the phase computing device 50 (computing unit 512) of this embodiment is configured to calculate an initial phase of each vibrator 11 that has a maximum sum of ultrasonic energy densities at respective points of space coordinates at which an interference pattern of ultrasonic waves is to be presented. The initial phase of each vibrator 11 that has a maximum sum of energy densities means an initial phase of each vibrator that gives a theoretically maximum value or maximal value regarding the sum of ultrasonic energy densities at the respective points of the space coordinates described above. The theoretically maximum value means a maximum value of interference waves, which is expressed by adding functions together in a case where wave motions generated by the individual vibrators constituting the phased array are expressed using an exponential function or a trigonometric function. The theoretically maximal value similarly means a maximal value of interference waves.

Hereinafter, details of the phase computing device 50 (computing unit 512) will be described.

[Phase Computing Device]

(General Outline)

(1) The phase computing device 50 (computing unit 512) is configured to generate an evaluation function, which indicates a correlation between the sum of ultrasonic energy densities at respective points of space coordinates at which an interference pattern of ultrasonic waves is to be presented, and the initial phase of each vibrator 11, and is configured to calculate an optimum solution of the initial phase of each vibrator 11, by which the evaluation function is made maximum or maximal.

In this embodiment, for the evaluation function in an example of presenting a two-dimensional haptic pattern, the sum (Esum) of ultrasonic energy densities at respective (X, Y, Z) points in a space haptic pattern is used.

(2) In this embodiment, the phase computing device 50 (computing unit 512) is configured to perform iterative computation of a recurrence formula of gradient descent to cause a computed value to converge to the optimum solution. The recurrence formula is obtained by differentiating the evaluation function described above.

The iterative computation of the recurrence formula based on the gradient descent allows calculation of the initial phase of the individual vibrator 11, which maximizes the ultrasonic energy densities at an optional position specified by the user (in this example, the position of the hand/finger H) and in the shape specified by the user.

(3) The phase computing device 50 (computing unit 512) is configured to perform iterative computation of a recurrence formula, which is obtained by dividing a derivative term of the evaluation function at each point of the space coordinates by an ultrasonic energy density of the point, to cause a computed value to converge to the optimum solution.

The derivative term at each of (X, Y, Z) points in the space haptic pattern is divided by the ultrasonic energy density ($E_{X, Y, Z}$) at each of the (X, Y, Z) points and is weighted, and thus the distribution of the ultrasonic energy density ($E_{X, Y, Z}$) can be smoothed.

It should be noted that, in a case where the value of the ultrasonic energy density ($E_{X, Y, Z}$) is 0 or close to 0, the phase computing device 50 executes the above-mentioned computation with $E_{X, Y, Z}$ being set to a larger value in order to avoid diffusion due to the division. For example, in a case where the value of the ultrasonic energy density ($E_{X, Y, Z}$) is smaller than 1, the phase computing device 50 executes the above-mentioned computation with $E_{X, Y, Z}$ being set to 1. The case where the value of the ultrasonic energy density ($E_{X, Y, Z}$) is close to 0 means that the value of the ultrasonic energy density ($E_{X, Y, Z}$) is substantially 0, and, herein, means 0 or more and smaller than 1.

(4) The phase computing device 50 (computing unit 512) is configured to calculate a step coefficient, which is obtained by dividing a predetermined constant by the number of points constituting the space coordinates described above, and is configured to perform iterative computation of the above-mentioned recurrence formula with the step coefficient being used as an update width for each step.

In other words, in this embodiment, in order to converge to the optimum solution irrespective of the shape of the spatial haptic feedback, a value obtained by dividing a predetermined constant "a" by the number of (X, Y, Z) points in the space haptic pattern is used as the coefficient (hereinafter, referred to as step coefficient) γ, which determines an update width of the initial phase for each step of the recurrence formula.

(5) The phase computing device 50 (computing unit 512) initializes, when the iterative computation is started in the calculation of an optimum solution, the initial phase of each vibrator 11 with an identical value.

In this embodiment, when the gradient descent is performed, in order to converge to the optimum solution, the initial phases of all the vibrators 11 are initialized with an identical value.

(6) The phase computing device 50 (computing unit 512) is configured to executes, in a case where a computation result of the above-mentioned recurrence formula is smaller than the last computation result, processing of decreasing the step coefficient described above.

In this embodiment, in the iterative computation of the recurrence formula by the gradient descent, in a case where the sum (Esum) of ultrasonic energy densities decreases in the computation from the n-th step (hereinafter, also referred to as n step) to the (n+1)-th step (hereinafter, also referred to as (n+1) step), a computation result of the (n+1)-th step is not employed. The computation of the (n+1)-th step is performed again with the step coefficient γ being set to (1/2)γ, for example.

A decrease rate of the step coefficient γ is not limited to ½ and can be set to an appropriate value.

(7) The phase computing device 50 (computing unit 512) is configured to output a current computation result as the optimum solution, in a case where a difference between the computation result of the above-mentioned recurrence formula and the last computation result is smaller than a predetermined threshold.

In this embodiment, in the iterative computation of the recurrence formula by the gradient descent, the computation is configured to be terminated in a case where a difference between the computation results from the n-th step to the (n+1)-th step is smaller than a predetermined threshold Th.

(Basic Principle)

Subsequently, the details of the phase computing device 50 will be described together with the basic principle.

A sound pressure P of ultrasonic waves at an optional point in an upper space of the phased array including N ultrasonic vibrators is described by the following expression (1)

[Math. 1]

$$P(t, r, \theta) = \sum_{i=1}^{N} P_i e^{j(\omega t - kr_i + \theta_i)} \quad (1)$$

Here, t represents a time, r represents a vector indicating an optional point, θ represents a vector including components of initial phases $\theta_1$ to $\theta_N$ of N vibrators, ω represents the number of angular vibrations of ultrasonic waves, k represents a wave number of ultrasonic waves (k=2π/λ), $r_i$ represents a distance from the i-th (1≤i≤N) vibrator to an optional point among the N vibrators forming the phased array, $\theta_i$ represents an initial phase of the i-th vibrator, $P_i$ represents an amplitude of ultrasonic waves generated by the i-th vibrator, and j represents an imaginary unit.

The vector r and the vector θ are described by the following expressions (2) and (3).

[Math. 2]

$$r=(x,y,z) \quad (2)$$

[Math. 3]

$$\theta=(\theta_1,\theta_2,\theta_3,\ldots,\theta_N) \quad (3)$$

Further, the energy density E of ultrasonic waves at a point r is proportional to the square of the amplitude (maximum sound pressure) P and is given by the following expression (4). Here, α represents a reflection coefficient of ultrasonic waves (at the interface between air and skin, α≈2), p represents the density of air, and c represents a sonic speed.

[Math. 4]

$$E(r, \theta) = \frac{\alpha}{\rho c^2}|P(t, r, \theta)|^2 \quad (4)$$

The strength of spatial haptic feedback, which is sensed by a human via ultrasonic waves, is considered to be proportional to the energy density (acoustic radiation pressure) E. Therefore, in order to present spatial haptic feedback with a particular shape through ultrasonic waves, it is only necessary to calculate such an initial phase that maximizes the energy density E at each point of that shape.

When the ultrasonic vibrator phased array is formed of N vibrators, as expressed by the expression (4), the energy density E at the point r is expressed by a function of an initial phase vector θ of the N vibrators. In this embodiment, approximate solutions of the components $\theta_1$ to $\theta_N$ of the initial phase vector θ that maximizes the energy density E are obtained by a numerical calculation using the computer. Here, an example of an approach based on the gradient descent is described, but a gradient method other than the gradient descent or a numerical calculation approach such as Newton's method may be used if the approximate solutions of the initial phase $\theta_1$ to $\theta_N$ are obtained.

Here, the gradient descent is an approach of obtaining a minimal value or maximal value of a certain function ƒ(x) by a numerical calculation using the computer. In general, the gradient descent is used in a case where a minimal value of energy or the like is obtained by a numerical calculation in a physical simulation, and is thus called a "descent" method. However, the gradient descent can obtain a maximal value as will be described later. This embodiment uses gradient descent aiming at obtaining a phase that maximizes an acoustic radiation pressure of ultrasonic waves (energy density of sonic waves).

Figure 3:
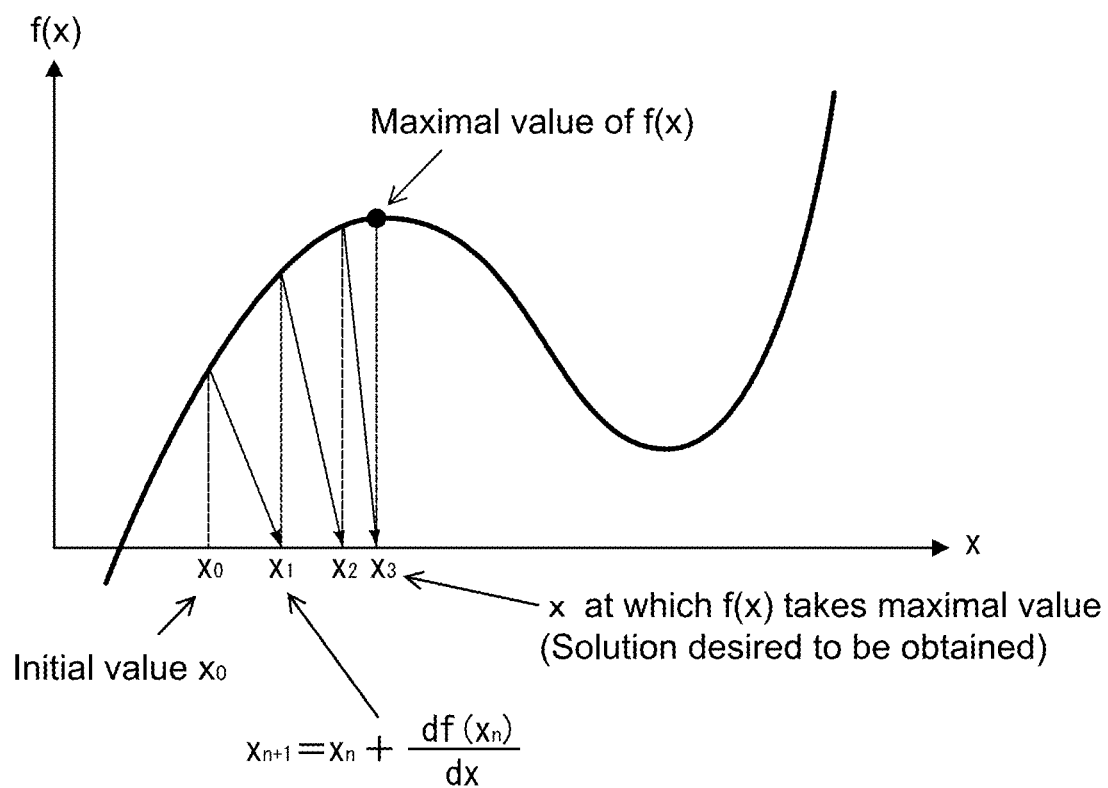
FIG. 3 is a diagram for describing the basic principle of a gradient descent in a case of one variable.

FIG. 3 shows the basic principle of the gradient descent in a case of one variable. In a case where a function ƒ(x) is given, and x, by which a maximal value of the function ƒ(x)

is given, is obtained by the gradient descent, first, an initial value $x_0$ of x is properly determined. A first-order differentiation $df(x_0)/dx$ of $x_0$ is calculated and added to $x_0$ to obtain $x_1$.

At that time, if $df(x_0)/dx$ is positive, the movement from $x_0$ to $x_1$ is toward the right. However, since the inclination of $x_0$ is positively sloped, the movement from $x_0$ to $x_1$ is the movement in a direction in which $f(x)$ increases. Conversely, if $df(x_0)/dx$ is negative, the movement from $x_0$ to $x_1$ is toward the left. However, since the inclination of $x_0$ is negatively sloped, the movement from $x_0$ to $x_1$ is also the movement in a direction in which $f(x)$ increases.

Therefore, when iterative computation is performed using $x_1=x_0+df(x_0)/dx$ as a general recurrence formula $x_{n+1}=x_n+df(x_n)/dx$, x approaches a point at which $f(x)$ is maximal (in the example of FIG. 3, $x_3$). For example, when the change in $f(x)$ becomes smaller than a certain threshold, the iterative computation is stopped, and this is set as an approximate solution (hereinafter, approaching an approximate solution by the gradient descent is also referred to as "convergence"). Further, typically, the derivative term is multiplied by the step coefficient γ, and the update width per step is adjusted.

Also in a case of multivariables, the basic idea is not different from the case of one variable. For example, it is conceived that x and y, by which a maximal value of a function $f(x, y)$ is given, are calculated. As in the case of one variable, the recurrence formulae are described as follows and only need to be subjected to iterative computation.

$$x_{n+1}=x_n+\partial f(x_n,y_n)\partial x \quad (a)$$

$$y_{n+1}=y_n+\partial f(x_n,y_n)\partial y \quad (b)$$

Figure 4:
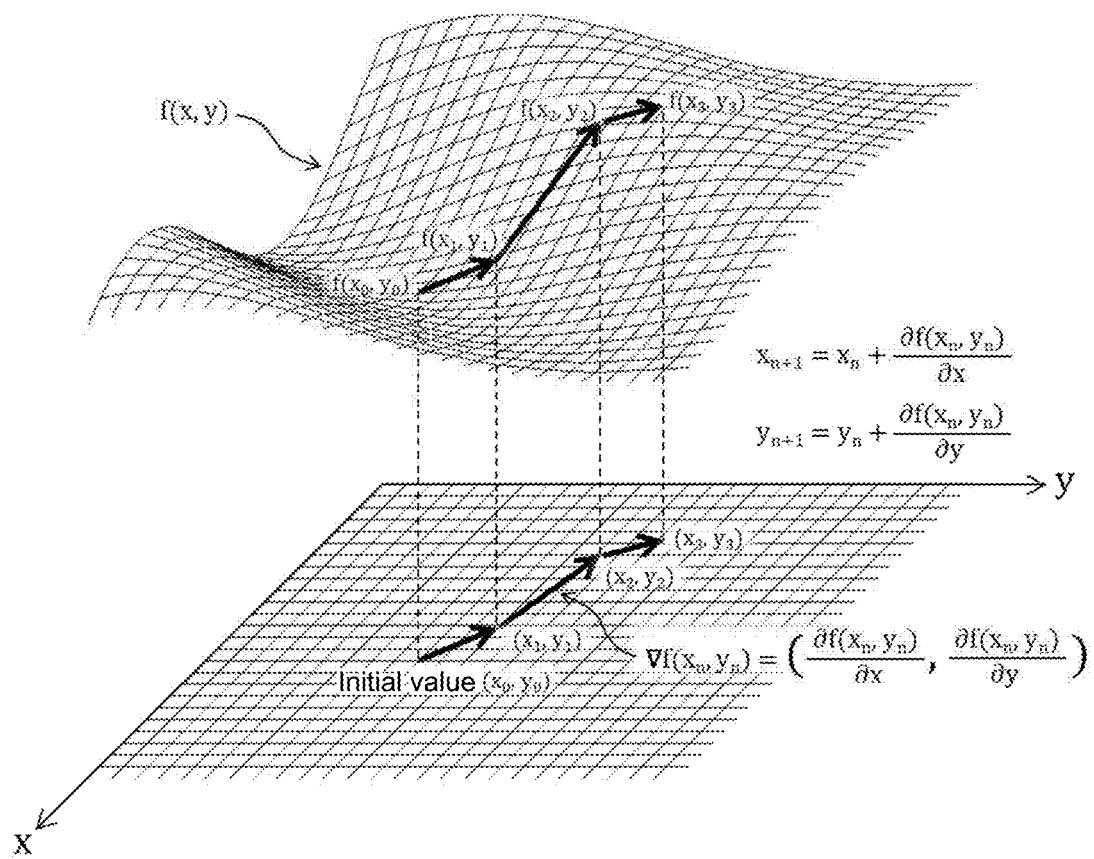
FIG. 4 is a diagram showing an image of a gradient descent in a case of two variables.

FIG. 4 shows an image of the gradient descent in the case of two variables. Derivative terms of the expressions (a) and (b) are respectively an x component and a y component of a vector ($\nabla f(x_n, y_n)$) in a direction in which the gradient is maximum at $x_n$ and $y_n$, and $x_{n+1}$ and $y_{n+1}$ are points that proceed by the magnitude of the gradient in that direction, with $x_n$ and $y_n$ being as starting points.

Also in the case of three or more variables, if recurrence formulae corresponding to the number of variables are described, the maximal value of the function can be obtained by iterative computation.

The method of computing the initial phase by using a numerical calculation based on the gradient descent described above will be continuously described.

The expression (5) shows a recurrence formula of the gradient descent obtained from the expression (4).

[Math. 5]

$$\theta[n+1]=\theta[n]+\gamma\nabla E(r,\theta[n]) \quad (5)$$

Here, $\nabla$ is a vector including, as a component, a differential operator with respect to N initial phases as described in the expression (6). θ[n] and θ[n+1] represent initial phase vectors of the n-th step and the (n+1)-th step in the recurrence formula, respectively.

[Math. 6]

$$\nabla = \left(\frac{\partial}{\partial \theta_1}, \frac{\partial}{\partial \theta_2}, \frac{\partial}{\partial \theta_3}, \cdots, \frac{\partial}{\partial \theta_N}\right) \quad (6)$$

This recurrence formula is subjected to iterative computation by a computer program, and approximate solutions of $\theta_1$ to $\theta_N$ can be obtained. However, the expression (5) is a recurrence formula for maximizing the ultrasonic energy density at the single point r. In order to maximize the ultrasonic energy density of each point forming a desired haptic pattern, the ultrasonic energy density needs to be maximized for not only a certain particular point but also each point at which haptic feedback is intended to be presented.

In this regard, in this embodiment, the sum of the ultrasonic energy densities of the respective points of the haptic feedback is expressed as a linear expression, which is set as an evaluation function Esum to be maximized. The evaluation function Esum is expressed by the expression (7), and a recurrence formula of the gradient descent obtained by differentiating the evaluation function Esum is expressed by the expression (8).

[Math. 7]

$$E\text{sum}(\theta) = \sum_{X,Y,Z} E(r_{X,Y,Z},\theta) \quad (7)$$

[Math. 8]

$$\theta[n+1] = \theta[n] + \gamma \nabla E\text{sum}(\theta[n]) \quad (8)$$
$$= \theta[n] + \gamma \sum_{X,Y,Z} \nabla E(r_{X,Y,Z},\theta[n])$$

In the expressions (7) and (8), X, Y, and Z are coordinates of a position at which the spatial haptic feedback is intended to be presented. In this embodiment, those coordinates are specified using electronic data (such as bitmap or CAD). In the specifying method, the output of the input unit 40, which has been described with reference to FIG. 2, is referred to. In other words, the X, Y, Z coordinates may be specified using the coordinates of a video generated by input electronic data, for example, CAD or 3D computer graphics (CG) or using an electronic text file describing the coordinates or a CSV (Comma-Separated Values) file. Further, only the two-dimensional coordinates (X, Y) may be specified by two-dimensional electronic image data such as bitmap, and only the Z coordinate may be specified by numerical value data.

At that time, the control to dynamically move an interference point of ultrasonic waves emitted from each vibrator 11 may be executed. In this case, the system may monitor the detected coordinates of the hand/finger H and the coordinates at which haptic feedback is intended to be presented, and may set a logical conjunction of both the coordinates (coordinates of an overlapping portion) to be haptic presentation coordinates to present haptic feedback. In such a manner, haptic feedback is presented at only a position where the hand/finger H exists, and thus the energy density of ultrasonic waves applied to the hand/finger can be concentrated, and stronger haptic feedback can be effectively given.

Figure 5:
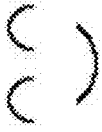
FIG. 5 shows simulation results showing one action of the haptic presentation system.
Figure 5:
Figure 5:
Figure 5:
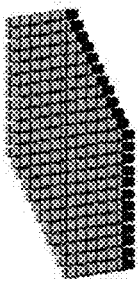
Figure 5:
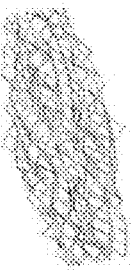
Figure 5:
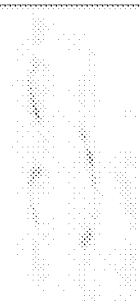
Figure 5:
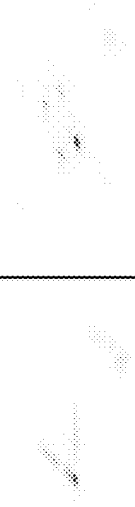
Figure 5:
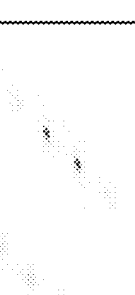
Figure 5:
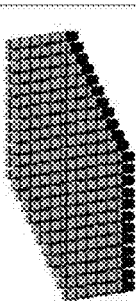
Figure 5:
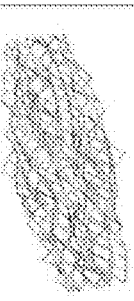
Figure 5:
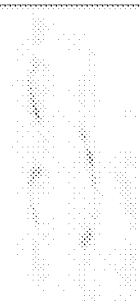
Figure 5:
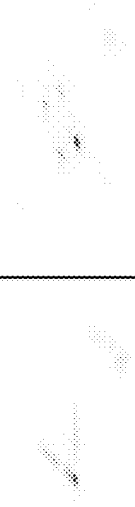
Figure 5:
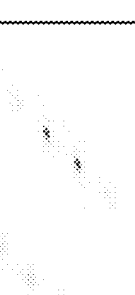
Figure 5:
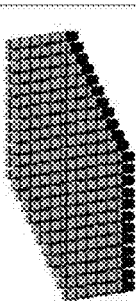
Figure 5:
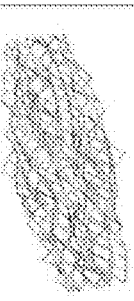
Figure 5:
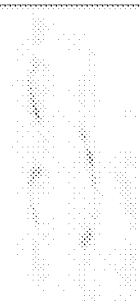
Figure 5:
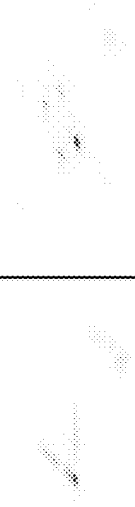
Figure 5:
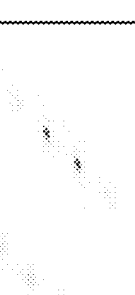
Figure 5:
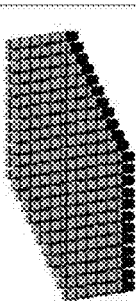
Figure 5:
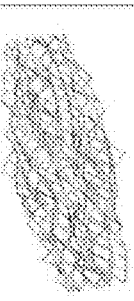

FIG. 5 shows simulation results when the ultrasonic energy density at a height Z, at which haptic feedback is to be presented, is calculated for various input shapes on the basis of the initial phase data obtained by the iterative computation of the expression (8). The input shapes in patterns 1 to 5 were respectively one point, four points, substantially L-shaped, circular, and a combination of a plurality of curved lines. The individual vibrators constituting the phased array were arranged in a hexagonal close-packed manner, and the number of vibrators was 397. The acoustic radiation pressure (ultrasonic energy density) of each point constituting the input shape is expressed by the gradation, and a larger difference in gradation means a larger difference in acoustic radiation pressure.

From those results, it is possible to present spatial haptic feedback with an optional shape by using the initial phase data obtained by the iterative computation of the expression (8). However, FIG. 5 shows that the energy density varies at each point at which the ultrasonic energy density is intended to be maximized (at which haptic feedback is intended to be presented), and it is found that, depending on the input shapes, the haptic pattern is different from the haptic pattern intended by the user. This is because considering the expression (7) as an evaluation function and maximizing it provides only a condition to maximize the sum of the energy densities of the respective points at which the spatial haptic feedback is intended to be presented, and smoothness thereof and the like are not considered.

In order to improve this respect, in a case where the ultrasonic energy densities are likely to be concentrated on a particular (X, Y, Z) point in the course of the iterative computation of the recurrence formula performed by a computer, it is necessary to devise a deliberate reduction in a gradient vector $EE(r_{X, Y, Z}, \theta)$, which acts in a direction increasing the energy density of the (X, Y, Z) point.

In this regard, in this embodiment, as shown in the expression (9), each derivative term of the energy density E of the expression (8) is divided by that energy density E for each step of the recurrence formula, to improve the magnitude of the gradient vector so as to be automatically adjusted. This is used as a recurrence formula of final gradient descent.

[Math. 9]

$$\theta[n+1] = \theta[n] + \gamma \sum_{X,Y,Z} \frac{\nabla E(r_{X,Y,Z}, \theta[n])}{E(r_{X,Y,Z}, \theta[n])} \quad (9)$$

FIG. 6 shows simulation results using the initial phase data obtained by the iterative computation of the recurrence formula of the expression (9) performed by a computer. It is found that the variations of the ultrasonic energy densities as seen in FIG. 5 are greatly improved.

By the way, when the gradient descent is performed, it is necessary to set an appropriate value $\theta[0]$ to the initial phase vectors $\theta$ of all the vibrators at the beginning (initialize the initial phase vectors $\theta$ with an appropriate value $\theta[0]$). In other words, depending on the initial value (the initial value used herein does not means the initial phase, but it means a value at the 0-th step in the iterative computation of the recurrence formula), the gradient descent is not performed as intended, and a computation result may converge to a maximal value (local solution) that is not a maximum value. Meanwhile, if the initial value $\theta[0]$ of the recurrence formula in all of the vibrators is set to an identical value (e.g., $\theta_1$ to $\theta_N=0$, $\theta_1$ to $\theta_N=\pi$), the initial phase (optimum solution or local solution close thereto) forming the interference pattern of an input shape tends to be obtained without depending on that shape. Thus, in a case where a series of iterative computation of the recurrence formula is terminated and iterative computation for another shape is started, it is favorable to initialize the initial phases of all the vibrators with an identical value.

Typically, the iterative computation of the recurrence formula by the gradient descent is stopped after performed an appropriate number of times. In this embodiment, in a case where the update width of the energy density per step of the recurrence formula takes a predetermined threshold Th or less, it is determined that the gradient descent has converged, and the computation is then stopped. The threshold Th may be capable of being specified by the user or may be a default value. In a case where a reduction in computation speed or in a circuit scale has priority, it is appropriate for the threshold Th to be approximately 1% of a theoretically maximum energy density when ultrasonic waves from all of the vibrators are caused to interfere at one point. Meanwhile, in a case where the convergence accuracy has priority, it is most suitable that the threshold Th is approximately 0.01% of the maximum energy density.

In the gradient descent, the update width of a variable (here, initial phase) for each step of the recurrence formula largely depends on convergence efficiency or a probability of convergence to the optimum solution. As indicated in the expression (9), the magnitude of the sum of the derivative terms (the number of terms for the sum) varies according to the number of points of the haptic feedback intended to be presented. Thus, in a case where the step coefficient $\gamma$, which determines the update width of the variable, is a constant, the update width of the initial phase varies according to the number of points of the haptic feedback intended to be presented. In this regard, it is favorable to use, as the step coefficient $\gamma$, a value obtained by dividing a certain constant "a" by the number of derivative terms added together. The value of the constant "a" is not particularly limited and is typically approximately 0.1, for example in a case of using where ultrasonic waves of 40 kHz. Accordingly, it is possible to converge to the optimum solution without depending on the input shape.

In the course of the iterative computation of the recurrence formula by the gradient descent, in a case where the sum (Esum) of the ultrasonic energy densities decreases in the computation from the n-th step to the (n+1)-th step, a computation result of the (n+1)-th step is not employed. It is desirable to perform the computation of the (n+1)-th step again with the step coefficient $\gamma$ being set to $(1/2)\gamma$. Accordingly, the efficiency of convergence to the optimum solution can be enhanced.

In a case where the sum (Esum) of the ultrasonic energy densities still decreases in the computation of the (n+1)-th step, the phase computing device 50 only needs to further set the step coefficient $\gamma$ to $(1/2)\gamma$ and perform the computation of the (n+1)-th step again. Such processing may be repeated until the sum (Esum) of the ultrasonic energy densities increases.

[Operation of Haptic Presentation System]

Subsequently, a typical operation of the haptic presentation system 100 of this embodiment will be described.

Figure 7:
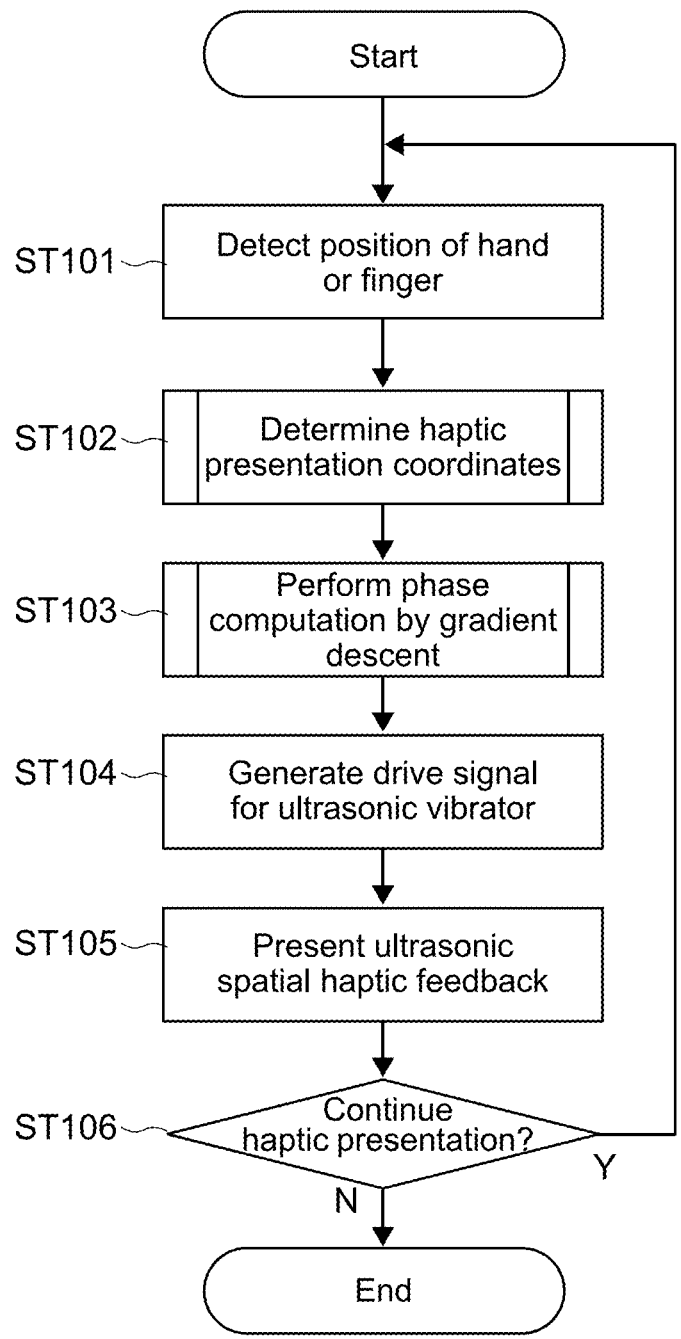
FIG. 7 is a flowchart showing an example of a processing procedure in the haptic presentation system.
Figure 8:
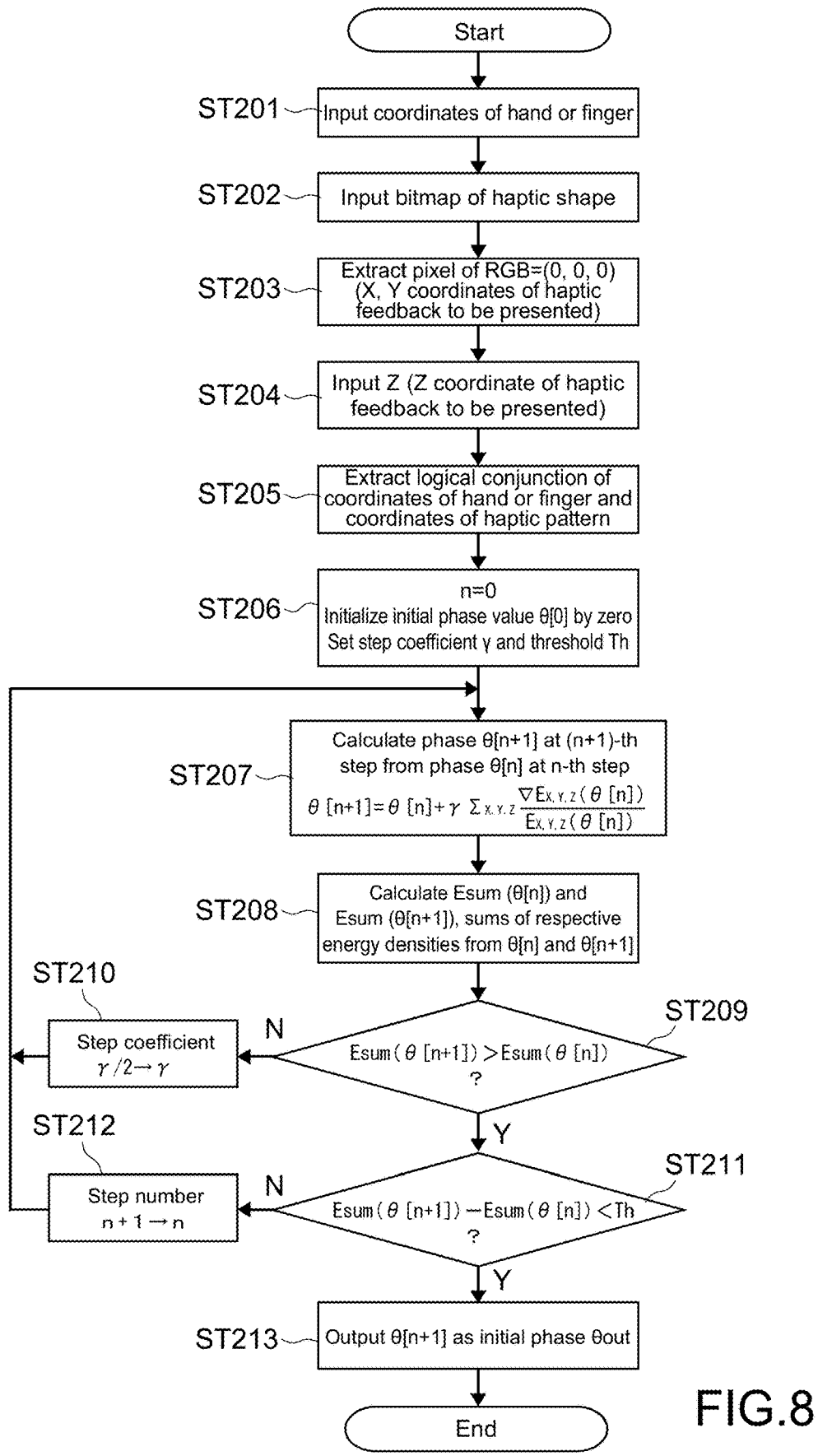
FIG. 8 is a flowchart showing the details of FIG. 7.

FIG. 7 is a flowchart showing an example of the processing procedure of the controller 20 (phase computing device 50 and drive unit 60). FIG. 8 is a flowchart showing an example of the operation procedure of the haptic presentation system 100.

The controller 20 has a position detection step (ST101), a coordinate determination step (ST102, ST201 to 205), an initial-phase computing step (ST103, ST206 to 213), a drive signal generation step (ST104), and a haptic presentation step (ST105).

(Position Detection)

In the position detection step (ST101), a position of the hand/finger H of the user held above the ultrasonic vibrator array 10 is detected. This step can be omitted as necessary in a case where the shape or position for haptic presentation is fixed, for example.

The position of the hand/finger H is detected by the detector 30, and an output signal of the detector 30 is transmitted to the controller 20 (phase computing device 50). The transmission method may be a wired method or a wireless method. Here, two-dimensional (X, Y) coordinates of the hand/finger H projected on the ultrasonic vibrator array 10 (ultrasonic wave emission surface) and a Z-axis coordinate corresponding to the distance (height) from the ultrasonic vibrator array 10 to the hand/finger H are detected. The distance (height) is, for example, several cm to several tens of cm.

(Coordinate Determination)

In the coordinate detection step (ST102, ST201 to 205), space coordinates at which spatial haptic feedback is to be presented are determined.

The phase computing device 50 (coordinate determination unit 511) determines, as the space coordinates, two-dimensional coordinates indicating the interference pattern, and a distance coordinate from the ultrasonic vibrator array 10 to the presentation position of the interference pattern.

The space coordinates are determined on the basis of outputs of the detector 30 and the input unit 40. For example, the output of the detector 30 is a three-dimensional detection signal of the hand/finger H by a hand tracking sensor (ST201).

Subsequently, in a case where the output of the input unit 40 is two-dimensional (X, Y) electronic image data, the coordinate determination unit 511 uses such electronic image data as two-dimensional coordinates (X, Y) of the haptic pattern (ST202). For the electronic image data, bitmap data of 64×64 pixels (1 pixel corresponds to 4 mm by 4 mm of real space) is used.

More specifically, the coordinate determination unit 511 extracts, by using the electronic image data from the input unit 40, haptic-pattern two-dimensional coordinates (X, Y) from a pixel (RGB=(0, 0, 0)) of the space coordinates at which haptic feedback is to be presented (ST203).

Furthermore, the coordinate determination unit 511 adds height information (Z) of the haptic pattern, which is obtained as numerical value information from the input unit 40, to the two-dimensional coordinates and extracts haptic-pattern three-dimensional coordinates (X, Y, Z) (ST204).

Subsequently, the coordinate determination unit 511 extracts a logical conjunction of the three-dimensional coordinates of the hand/finger H from the detector 30 and the three-dimensional coordinates of the haptic pattern, i.e., coordinates of an overlapping portion between a part or all of the three-dimensional coordinates of the hand/finger H and a part or all of the three-dimensional coordinates of the haptic pattern, and determines the extracted coordinates to be three-dimensional coordinates (X, Y, Z) for haptic presentation, which are space coordinates to be presented to the hand/finger H (ST205).

ST203 and ST204 may be executed in the inverse order, or ST203 and ST204 may be executed in the same step.

(Initial-Phase Computation)

In the initial-phase computing step (ST103, ST206 to 213), the initial phase of each vibrator 11 of the ultrasonic vibrator array 10 is obtained by computation. Here, on the basis of the haptic presentation coordinates determined in the coordinate determination unit 511, the initial phase of each vibrator 11 in which the ultrasonic waves output from the ultrasonic vibrator array 10 are mutually strengthened at the haptic presentation coordinates is calculated.

The computing unit 512 generates an evaluation function indicating a correlation between the sum of ultrasonic energy densities at respective points of the haptic presentation coordinates and the initial phase of each vibrator 11, and calculates an optimum solution of the initial phase of each vibrator, by which the evaluation function is made maximum. In this embodiment, the computing unit 512 uses, as the evaluation function described above, the evaluation function Esum indicated by the expression (7).

As indicated by the expression (8), the computing unit 512 uses the gradient descent based on the iterative computation of the recurrence formula obtained by differentiating the evaluation function Esum, to cause a computed value to converge to the optimum solution.

In particular, in this embodiment, the iterative computation is performed on the recurrence formula (see expression (9)) obtained by dividing a derivative term of the sum of the ultrasonic energy densities at the respective points of the haptic presentation coordinates, i.e., the evaluation function Esum, by the ultrasonic energy density of each point, to cause a computed value to converge to the optimum solution.

Here, first, the computing unit 512 initializes the step number n of the recurrence formula of the gradient descent with 0, and also initializes the initial phase vector θ[0] with the same phase (e.g., 0 (zero vector)). The computing unit 512 counts the number of points, at which the haptic feedback is to be presented, from the haptic presentation coordinates obtained in ST205, and divides the constant "a" (=0.1) by the number of points, at which the haptic feedback is to be presented, to set a resultant value to be the step coefficient γ. Furthermore, the computing unit 512 sets a threshold Th to be a reference to terminate the iterative computation of the recurrence formula (ST206).

Subsequently, the computing unit 512 calculates a derivative term $EE_{X, Y, Z}$ of the ultrasonic energy density and an ultrasonic energy density $E_{X, Y, Z}$ at each point of the haptic presentation coordinates (X, Y, Z), and obtains the sum at each point of the haptic presentation coordinates (X, Y, Z) regarding $\nabla E_{X, Y, Z}/E_{X, Y, Z}$. The computing unit 512 multiplies the sum by the step coefficient γ obtained in ST206 and further adds the initial phase vector θ[n] obtained in ST206 or ST212 to be described later, to obtain θ[n+1] (see ST207 and the expression (9)).

Subsequently, the computing unit 512 calculates, from the initial phase vectors θ[n] and θ[n+1], the ultrasonic energy densities Esum (θ[n]) and Esum (θ[n+1]) corresponding to the respective initial phases thereof, by the expression (7) (ST208).

The computing unit 512 compares the magnitude of the ultrasonic energy density Esum (θ[n]) of the n-th step and the magnitude of the ultrasonic energy density Esum (θ[n+1]) of the (n+1)-th step, which are obtained in ST208, with each other (ST209). Here, when Esum (θ[n+1])>Esum (θ[n]), the processing proceeds to ST211. When Esum (θ[n+1])≤Esum (θ[n]), the step coefficient γ is updated to a new step coefficient γ, (1/2) times as large as the step coefficient γ, and the processing returns to ST207 (ST210).

Subsequently, the computing unit 512 calculates a difference between the ultrasonic energy density Esum (θ[n+1]) of the (n+1)-th step and the ultrasonic energy density Esum (θ[n]) of the n-th step, which is calculated in ST209. If the difference is smaller than the threshold Th, the computing unit 512 outputs the obtained θ[n+1] as an initial phase $θ_{OUT}$ (ST213. Meanwhile, if the difference is larger than the threshold Th, the processing returns to ST207. At that time, n is incremented to n+1 (ST212).

(Drive Signal Generation)

In the drive signal generation step (ST104), on the basis of the initial phase $θ_{OUT}$ output from the phase computing device 50, the drive unit 60 generates a drive signal for each vibrator 11 of the ultrasonic vibrator array 10.

(Haptic Presentation)

In the haptic presentation step (ST105), on the basis of the drive signal output from the drive unit 60, each vibrator 11 of the ultrasonic vibrator array 10 is driven with a predetermined initial phase. Accordingly, spatial haptic feedback corresponding to the interference pattern is presented to the hand/finger H of the user.

The haptic presentation typically needs to recalculate the initial phase, because the haptic presentation coordinates change each time the position of the hand/finger H changes. Actually, even if the position of the hand/finger H does not change, the phase computation may be continued for update. If the haptic presentation is continued, the processing returns to ST101 (ST106).

Further, the haptic presentation is typically continued until the hand/finger H disappears from immediately above the ultrasonic vibrator array 10. When the controller 20 (phase computing device 30) determines on the basis of the output of the detector 30 that the hand/finger H disappears from above the ultrasonic vibrator array 10, the haptic presentation is terminated (ST106). Instead, the haptic presentation may be terminated at the time when a preset operation time has elapsed.

As described above, according to this embodiment, the initial phase in which the sum of the ultrasonic energy densities at respective points of the space, in which the interference pattern is to be presented, is maximum is calculated for each vibrator of the ultrasonic vibrator array. Thus, an ultrasonic interference pattern with a desired optional shape can be formed.

According to this embodiment, the following effects can further be obtained.

It is possible to intuitively specify the shape of the interference pattern to be presented to the user by using electronic image data, and also automatically optimize the initial phases of the individual vibrators 11 constituting the ultrasonic vibrator array 10, on the basis of the electronic image data.

Even if the interference pattern is complicated, an interference pattern with a spatial expanse can be formed without moving one interference point at high speed. Thus, temporal fluctuations on the interference pattern, which are likely to occur when one interference point is moved at high speed, can be suppressed.

It is also possible to temporally switch between interference patterns formed on a space to form an interference pattern with a desired shape. For example, by high-speed switching between positions where arc-like interference patterns are formed, haptic feedback being circular as a whole can be presented. Accordingly, strong spatial haptic feedback can be presented in a wide region.

Compared with an existing simulator that needs trials a plurality of times until a desired interference pattern is obtained, this embodiment only needs to perform one-time computation because the phase is computed from a target interference pattern, and high-speed processing of the system can be achieved.

When a relative position of the hand/finger H with respect to the ultrasonic vibrator array 10 is changed, it is also possible to dynamically change a position, at which the interference pattern is formed, by following the movement of the hand/finger H. For example, when the controller 20 determines on the basis of the output of the detector 30 that the hand/finger H has moved, the controller 20 only needs to recalculate the initial phase with the position of the moved hand/finger H being a reference.

This embodiment is not limited to the application example for the haptic presentation system. For example, it is also possible to float an object (typically, lightweight object such as powder or sheet) within a space while using the ultrasonic interference pattern as buoyancy or to move that object within the space.

<Other Embodiments>

The phase computing device according to the present technology calculates a sound pressure P of ultrasonic waves on the basis of general wave motion that can be described using the expression (1). Thus, with a vibrator phased array that outputs wave motion, which can be described using the expression (1), such as electromagnetic waves including visible light without being not limited to the ultrasonic waves, the present technology can also be applied to others excluding the ultrasonic waves (e.g., electromagnetic waves). The wave motion used herein means various energy waves that are emitted from the vibrator phased array and may exert a mechanical action, an electromagnetic action, or the like on a target object.

APPLICATION EXAMPLE 1

The phase computing device is configured to be capable of calculating the initial phase of each visible light source constituting a phased array while aiming at forming an interference light image at an optional space position. In this case, it is suitable to put a light-diffusing substance (e.g., a fluid such as water or mist, or a fixed object such as a screen) at an optional space position. By temporally switching between formed interference light images, reproduction of animation images or moving images can also be enabled.

APPLICATION EXAMPLE 2

The phase computing device is configured to be capable of calculating the initial phase of each electromagnetic wave transmitter (vibrator) constituting a phased array while aiming at forming an interference pattern of an electromagnetic energy density at an optional space position. This can achieve contactless power supply to a stationary or moving device or a movable body.

It should be noted that the present technology can take the following configurations.

(1) A phase computing device, including:

a coordinate determination unit that determines space coordinates at which an interference pattern of wave motion emitted from a vibrator phased array is to be presented, the wave motion including ultrasonic waves, electromagnetic waves, or other waves; and a computing unit that calculates an initial phase of each vibrator, a sum of energy densities of the wave motion at respective points of the space coordinates being maximum in the initial phase.

(2) The phase computing device according to (1), in which the computing unit generates an evaluation function indicating a correlation between the sum of the energy densities of the wave motion at the respective points of the space coordinates and the initial phase of each vibrator, and calculates an optimum solution of the initial phase of each vibrator, the evaluation function being made maximum or maximal by the optimum solution.

(3) The phase computing device according to (2), in which the computing unit performs iterative computation of a recurrence formula of a gradient descent, to cause a computed value to converge to the optimum solution, the recurrence formula being obtained by differentiating the evaluation function.

(4) The phase computing device according to (3), in which the computing unit
calculates a step coefficient, the step coefficient being obtained by dividing a predetermined constant by the number of points constituting the space coordinates, and
performs iterative computation of the recurrence formula with the step coefficient being as an update width for each step.

(5) The phase computing device according to (4), in which the computing unit executes, in a case where a computation result of the recurrence formula is smaller than a last computation result, processing of decreasing the step coefficient.

(6) The phase computing device according to any one of (3) to (5), in which
the computing unit outputs, in a case where a difference between a computation result of the recurrence formula and a last computation result is smaller than a predetermined threshold, a current computation result as the optimum solution.

(7) The phase computing device according to any one of (3) to (6), in which
the computing unit performs iterative computation of a recurrence formula, to cause a computed value to converge to the optimum solution, the recurrence formula being obtained by dividing a derivative term of the evaluation function at each point of the space coordinates by the ultrasonic energy density of the wave motion at the point.

(8) The phase computing device according to (7), in which
the computing unit divides, in a case where the energy density of the wave motion at each point is a value of 0 or close to 0, the derivative term with the energy density of the wave motion being set to be larger than the value.

(9) The phase computing device according to any one of (2) to (8), in which
the computing unit initializes, in a calculation of the optimum solution, the initial phase of each vibrator with an identical value.

(10) The phase computing device according to any one of (1) to (9), in which
the coordinate determination unit determines, as the space coordinates, two-dimensional coordinates indicating the interference pattern, and a distance coordinate from the vibrator phased array to a presentation position of the interference pattern.

(11) The phase computing device according to (10), in which
the coordinate determination unit
determines the two-dimensional coordinates on the basis of electronic image data indicating the interference pattern, and
determines three-dimensional coordinates of a haptic pattern together with distance information, the distance information being input in a numerical value.

(12) A phase computing method, including:
determining space coordinates at which an interference pattern of wave motion emitted from a vibrator phased array is to be presented, the wave motion including ultrasonic waves, electromagnetic waves, or other waves; and
calculating an initial phase of each vibrator, a sum of energy densities of the wave motion at respective points of the space coordinates being maximum in the initial phase.

(13) A haptic presentation system, including:
a vibrator phased array;
a coordinate determination unit that determines space coordinates at which an interference pattern of wave motion emitted from the vibrator phased array is to be presented, the wave motion including ultrasonic waves, electromagnetic waves, or other waves; and
a computing unit that calculates an initial phase of each vibrator, a sum of energy densities of the wave motion at respective points of the space coordinates being maximum in the initial phase.

(14) The haptic presentation system according to (13), further including:
an input unit to which information associated with the interference pattern is input; and
a detector that detects a position at which the interference pattern is to be presented, in which
the coordinate determination unit determines the space coordinates on the basis of an output of the input unit and an output of the detector.

(15) A program that causes a computer to execute the steps of:
determining space coordinates at which an interference pattern of wave motion emitted from a vibrator phased array is to be presented, the wave motion including ultrasonic waves, electromagnetic waves, or other waves; and
calculating an initial phase of each vibrator, a sum of energy densities of the wave motion at respective points of the space coordinates being maximum in the initial phase.

(16) A phase computing device, including:
a coordinate determination unit that determines space coordinates at which an interference pattern of electromagnetic waves emitted from a vibrator array is to be presented; and
a computing unit that calculates an initial phase of each vibrator, a sum of electromagnetic energy densities at respective points of the space coordinates being maximum in the initial phase.

REFERENCE SIGNS LIST 10 ultrasonic vibrator array
11 vibrator
20 controller
30 detector
40 input unit
50 phase computing device
60 drive unit
100 haptic presentation system
511 coordinate determination unit
512 computing unit

The invention claimed is:
1. A phase computing device, comprising:
a coordinate determination unit that determines space coordinates at which an interference pattern of wave motion emitted from a vibrator phased array is to be presented, the wave motion including ultrasonic waves, wherein the interference pattern includes an interference of an opposite phase such that ultrasonic waves interfering at a first point cancel out acoustic radiation pressure of a second interference point to provide a shape besides one point, such that the shape is created by generating multiple interference points at the same time; and a computing unit that calculates an initial phase of each vibrator, a sum of energy densities of the wave motion at respective points of the space coordinates being maximum in the initial phase.

2. The phase computing device according to claim 1, wherein
the computing unit
generates an evaluation function indicating a correlation between the sum of the energy densities of the wave motion at the respective points of the space coordinates and the initial phase of each vibrator, and
calculates an optimum solution of the initial phase of each vibrator, the evaluation function being made maximum or maximal by the optimum solution.

3. The phase computing device according to claim 2, wherein
the computing unit performs iterative computation of a recurrence formula of a gradient descent, to cause a computed value to converge to the optimum solution, the recurrence formula being obtained by differentiating the evaluation function.

4. The phase computing device according to claim 3, wherein
the computing unit
calculates a step coefficient, the step coefficient being obtained by dividing a predetermined constant by the number of points constituting the space coordinates, and
performs iterative computation of the recurrence formula with the step coefficient being used as an update width for each step.

5. The phase computing device according to claim 4, wherein
the computing unit executes, in a case where a computation result of the recurrence formula is smaller than a last computation result, processing of decreasing the step coefficient.

6. The phase computing device according to claim 3, wherein
the computing unit outputs, in a case where a difference between a computation result of the recurrence formula and a last computation result is smaller than a predetermined threshold, a current computation result as the optimum solution.

7. The phase computing device according to claim 3, wherein
the computing unit performs iterative computation of a recurrence formula, to cause a computed value to converge to the optimum solution, the recurrence formula being obtained by dividing a derivative term of the evaluation function at each point of the space coordinates by the ultrasonic energy density of the wave motion at the point.

8. The phase computing device according to claim 7, wherein
the computing unit divides, in a case where the energy density of the wave motion at each point is a value of 0 or close to 0, the derivative term with the energy density of the wave motion being set to be larger than the value.

9. The phase computing device according to claim 2, wherein
the computing unit initializes, in a calculation of the optimum solution, the initial phase of each vibrator with an identical value.

10. The phase computing device according to claim 1, wherein
the coordinate determination unit determines, as the space coordinates, two-dimensional coordinates indicating the interference pattern, and a distance coordinate from the vibrator phased array to a presentation position of the interference pattern.

11. The phase computing device according to claim 10, wherein
the coordinate determination unit
determines the two-dimensional coordinates on a basis of electronic image data indicating the interference pattern, and
determines three-dimensional coordinates of a haptic pattern together with distance information, the distance information being input in a numerical value.

12. The phase computing device according to claim 1, wherein the shape includes at least one line.

13. The phase computing device according to claim 1, wherein the line is a straight line.

14. The phase computing device according to claim 1, wherein the line is a curved line.

15. A phase computing method, comprising:
determining space coordinates at which an interference pattern of wave motion emitted from a vibrator phased array is to be presented, the wave motion including ultrasonic waves, wherein the interference pattern includes an interference of an opposite phase such that ultrasonic waves interfering at a first point cancel out acoustic radiation pressure of a second interference point to provide a shape besides one point, such that the shape is created by generating multiple interference points at the same time; and
calculating an initial phase of each vibrator, a sum of energy densities of the wave motion at respective points of the space coordinates being maximum in the initial phase.

16. A haptic presentation system, comprising:
a vibrator phased array;
a coordinate determination unit that determines space coordinates at which an interference pattern of wave motion emitted from the vibrator phased array is to be presented, the wave motion including ultrasonic waves, wherein the interference pattern includes an interference of an opposite phase such that ultrasonic waves interfering at a first point cancel out acoustic radiation pressure of a second interference point to provide a shape besides one point, such that the shape is created by generating multiple interference points at the same time; and
a computing unit that calculates an initial phase of each vibrator, a sum of energy densities of the wave motion at respective points of the space coordinates being maximum in the initial phase.

17. The haptic presentation system according to claim 16, further comprising:
an input unit to which information associated with the interference pattern is input; and
a detector that detects a position at which the interference pattern is to be presented, wherein
the coordinate determination unit determines the space coordinates on a basis of an output of the input unit and an output of the detector.

18. A non-transitory computer readable medium that stores instructions to cause a computer to execute the steps of:

determining space coordinates at which an interference pattern of wave motion emitted from a vibrator phased array is to be presented, the wave motion including ultrasonic waves, wherein the interference pattern includes an interference of an opposite phase such that ultrasonic waves interfering at a first point cancel out acoustic radiation pressure of a second interference point to provide a shape besides one point, such that the shape is created by generating multiple interference points at the same time; and calculating an initial phase of each vibrator, a sum of energy densities of the wave motion at respective points of the space coordinates being maximum in the initial phase.

* * * * *